(12) United States Patent
Suzuki et al.

(10) Patent No.: US 11,850,521 B2
(45) Date of Patent: Dec. 26, 2023

(54) SERVER DEVICE, CONTROL METHOD FOR SERVER DEVICE, GAME SYSTEM, AND COMPUTER-READABLE RECORDING MEDIUM

(71) Applicant: GREE, INC., Tokyo (JP)

(72) Inventors: Koichi Suzuki, Tokyo (JP); Eigo Isomura, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 17/854,928

(22) Filed: Jun. 30, 2022

(65) Prior Publication Data

US 2022/0331699 A1   Oct. 20, 2022

Related U.S. Application Data

(63) Continuation of application No. 17/019,618, filed on Sep. 14, 2020, now Pat. No. 11,413,544, which is a (Continued)

(30) Foreign Application Priority Data

Jun. 24, 2013 (JP) .................................. 2013-131734
Jan. 17, 2014 (JP) .................................. 2014-006632
Jan. 17, 2014 (JP) .................................. 2014-006641

(51) Int. Cl.
| | | |
|---|---|---|
| *A63F 13/795* | (2014.01) | |
| *A63F 13/822* | (2014.01) | |
| *A63F 13/792* | (2014.01) | |
| *A63F 13/70* | (2014.01) | |
| *A63F 13/35* | (2014.01) | |
| *A63F 13/95* | (2014.01) | |

(52) U.S. Cl.
CPC ............ *A63F 13/795* (2014.09); *A63F 13/35* (2014.09); *A63F 13/70* (2014.09); *A63F 13/792* (2014.09); *A63F 13/822* (2014.09); *A63F 13/95* (2014.09); *A63F 2300/5513* (2013.01)

(58) Field of Classification Search
CPC ........ A63F 13/795; A63F 13/35; A63F 13/70; A63F 13/792; A63F 13/822; A63F 13/95; A63F 2300/5513
USPC .......................................................... 463/42
See application file for complete search history.

(56) References Cited

U.S. PATENT DOCUMENTS

| | | | | |
|---|---|---|---|---|
| 8,260,858 B2 * | 9/2012 | Belz | ........................ | H04W 4/12 463/40 |
| 2010/0113160 A1 * | 5/2010 | Belz | ........................ | G06Q 30/02 463/42 |
| 2012/0295717 A1 * | 11/2012 | Belz | ........................ | H04W 4/24 463/42 |

FOREIGN PATENT DOCUMENTS

JP   2013-066524 A   4/2013

* cited by examiner

*Primary Examiner* — Pierre E Elisca
(74) *Attorney, Agent, or Firm* — Oliff PLC

(57) ABSTRACT

A server device and the like that can make a whole game and SNS more active by promoting the movement of players between groups to enhance the mobility of game participants. A server device comprises: a controller configured to enable a first player belonging to a first group to transfer to a second group based on an operation by a second player belonging to the second group, wherein the controller is configured to associate compensation for the transfer with the transfer of the first player. The controller is configured to perform payment and receipt of compensation for the transfer between at least two out of the first player, the first group, and the second group when the first player transfers from the first group to the second group.

20 Claims, 8 Drawing Sheets

Related U.S. Application Data continuation of application No. 16/126,328, filed on Sep. 10, 2018, now Pat. No. 10,799,800, which is a continuation of application No. 15/801,760, filed on Nov. 2, 2017, now Pat. No. 10,099,141, which is a continuation of application No. 15/390,876, filed on Dec. 27, 2016, now Pat. No. 9,833,711, which is a continuation of application No. 14/312,210, filed on Jun. 23, 2014, now Pat. No. 9,566,525.

SERVER DEVICE, CONTROL METHOD FOR SERVER DEVICE, GAME SYSTEM, AND COMPUTER-READABLE RECORDING MEDIUM

CROSS-REFERENCE TO RELATED APPLICATIONS

This application is a continuation of U.S. patent application Ser. No. 17/019,618, filed Sep. 14, 2020, which is a continuation of U.S. patent application Ser. No. 16/126,328, filed Sep. 10, 2018, which is a continuation of U.S. patent application Ser. No. 15/801,760, filed Nov. 2, 2017, now U.S. Pat. No. 10,099,141, which is a continuation of U.S. patent application Ser. No. 15/390,876, filed Dec. 27, 2016, now U.S. Pat. No. 9,833,711, which is a continuation of U.S. patent application Ser. No. 14/312,210, filed Jun. 23, 2014, now U.S. Pat. No. 9,566,525, which claims priority benefit of Japanese Patent Application No. 2013-131734, filed Jun. 24, 2013, Japanese Patent Application No. 2014-006632, filed Jan. 17, 2014, and Japanese Patent Application No. 2014-006641, filed Jan. 17, 2014, the disclosures of which are incorporated herein in their entirety by reference.

BACKGROUND

Disclosed herein are a server device, a control method for a server device, a game system, and a computer-readable recording medium.

Games provided from server devices to mobile terminals operated by players via communication networks have gained popularity in recent years, and many game titles have been released using a plurality of platforms. There are a wide variety of types and categories of such games. Of these, social games that enable a plurality of players to participate in the same game are particularly popular.

A social game uses a community network service called a social networking service (hereafter referred to as "SNS"). For example, a player (game user) logs into or signs into a platform provided by an SNS provider, and subscribes to a specific game or service beforehand according to need. The player can thus play various social games provided on the platform.

As a system (social game system) for a social game utilizing this feature of SNS, a system of performing a battle event such as a battle (combat) in which characters (player characters) operated by a plurality of players attack one or more enemy characters is known as an example. Here, each player can be a member of a specific group such as the below-mentioned guild, party, team, or community. When each player defeats an enemy character, not only the individual player but also the group to which the player belongs may be provided with various rewards such as points and items usable in the game.

Such a battle event intended to defeat an enemy character by a plurality of player characters is conventionally called a "raid battle" in the field of social games. The battle is also called "GvR" ("v" denotes versus, the same applies hereafter) where a group or a guild is denoted by its first English letter (G) and an enemy character in the raid battle is, as a raid character, denoted by its first English letter (R).

Social games of performing an individual battle event in which individual player characters fight each other and a group battle event (including not only a battle but also a competition in a team sport and the like) in which groups fight each other are widely known, too. As an example of the latter game, an online game of a group battle by a plurality of parties is described in JP2013-66524A. In this game, in a coliseum hall which is a predetermined virtual space, a group battle is fought when matching between a plurality of parties to which player characters belong is made. Such a direct battle between groups is conventionally called a "guild battle" in the field of social games. The battle is also called "GvG" where each group or guild is denoted by its first English letter (G) as mentioned above.

SUMMARY

In a social game, a player belonging to a group (e.g. a group which the player joins first) tends to remain in the group for a long time. As a result, the members (constituent members) of the group are fixed, which can cause the social game to become dull.

Embodiments of the invention provide a server device, a control method for a server device, a game system, and a computer-readable recording medium that can make a whole game and SNS more active by promoting the movement of players between groups to enhance the mobility of game participants.

To solve the problem stated above, a server device disclosed herein comprises: an information storage unit for storing, as a part of information related to a game in which a plurality of players are able to participate, information of a plurality of groups associated with the plurality of players; and a control unit for accessing the information and executing an operation related to the game. The control unit sets the game so as to enable a first player belonging to a first group out of the plurality of groups to transfer to a second group different from the first group and, when the first player transfers from the first group to the second group, performs payment and receipt of compensation for the transfer between at least two out of the first player, the first group, and the second group.

In the game realized by the server device having the structure described above, for example, each player can join any of the plurality of groups and participate in the game. For instance, in a battle event held as one of the events in the game, the player as a member of his or her group fights an opponent player belonging to an opponent group in the battle. This battle event corresponds to the above-mentioned "GvG", given that it is a direct battle between groups. However, the battle event is not limited to GvG.

The "player" is a user who operates a terminal device during the execution of the game, and represents a concept that corresponds to a client in a client-server system. The term "player" is used here, to distinguish it from a user (e.g. a server administrator) of the server device. Typically, the player can participate in the game through a player character who acts, moves, thinks, and the like in a virtual game space instead of the player and an appropriate game medium associated with the player character. As disclosed herein, the term "player" simply used in the following description may sometimes indicate the player character in a precise sense.

The "group" is, for example, a common name for a variety of virtual collections with elaborate performance, each of which have a plurality of members (constituent members), such as "guild", "party", "team", and "community". The group may be created or formed on a game title basis, or created or formed on a platform basis or the like as a common group or a shared group across a plurality of game titles. Note that not only an event of battle type such as "battle event" but also a different type of event such as an event of interaction between groups executed as a part of the social game may be included in the disclosure.

The player can connect the terminal device to the server device such as a computer via a communication line, and participate in the game including the above-mentioned battle event online or offline. In more detail, for example, the player can newly create or form a group or appropriately join an existing group in the game, on his or her own will or upon invitation or introduction by opponent or other player. The player can then participate in the battle event between groups and the like, as a member of the group to which the player belongs.

The game is set so as to enable the player to transfer from the group to which the player belongs to another group. That is, the "first player" belonging to the "first group" out of the plurality of groups can transfer (move, change) to the "second group" different from the "first group". For the first player who is the transferring party, the first group corresponds to the transfer source group, and the second group corresponds to the transfer destination group.

When the first player transfers from the first group to the second group, the control unit performs the payment and receipt of the compensation for the transfer between at least two out of the first player, the first group, and the second group. Exemplary modes in this case are as follows:

when the first player transfers from the first group to the second group, the second group as the transfer destination pays the compensation to the first player as the transferring party;

the first group as the transfer source pays the compensation to the first player as the transferring party;

the second group as the transfer destination pays the compensation to the first group as the transfer source; and the first group as the transfer source pays the compensation to the second group as the transfer destination.

The payment and receipt of the compensation upon the transfer of the player and especially the acquisition of the compensation by the first player as the transferring party serve as an incentive for the transfer of the first player. This promotes the transfer (movement) of players between groups, and enhances the mobility of players (game participants) in the game.

A player (the below-mentioned "second player") belonging to the second group as the transfer destination may present the compensation for the transfer to the first player beforehand, and invite the first player to transfer to the second player's group (the second group). This facilitates the transfer of a strong player who is experienced in battle events and the like and has an excellent ability to defeat enemy characters or opponent characters, to the second player's group with priority. The second player's group is easily strengthened in such a manner. The presentation of the compensation and the transfer invitation to the first player may be made in a state of being recognizable by unspecified players ("public offer") or in a state of being recognizable only by the first player ("secret offer").

Moreover, the information storage unit may store information of a transfer specific event in which the first player is able to acquire a specific game medium associated with the transfer, and the control unit may allow the first player to use the compensation for the transfer in the transfer specific event.

The "game medium" means content or an item that can be held and managed by the player in the game. Specific examples include a character card, an avatar, and a figure associated with the player character. They are handled in a virtual space (virtual game space) in the game, and represent a concept that includes "object" and the like. The "game medium" may directly evoke the player character, or indirectly evoke the player character (e.g. the player character's name, nominal designation, weapon, cloths, costume, spell, magic, skill (move), related character, etc.). The "game medium" may be displayed as a still image, a moving image, or a combination thereof. The "game medium" may be displayed not as an image but simply as text information. Depending on the situation, the "game medium" need not be visually perceivable, and may be only aurally perceivable, for example, audio information.

In such a structure, the first player who has acquired the compensation for the transfer can execute the transfer specific event by using the compensation. As a result, the first player can acquire the specific game medium not acquirable in a normal event and the like. This further motivates the first player to transfer. In other words, extra value is added to the act of "transfer", to further promote the transfer of the first player. For instance, the specific game medium may be made rarer than a normal game medium, or the amount of the specific game medium may be made significantly larger than the amount acquirable in the normal event. Thus further motivates the first player to transfer.

In more detail, the information storage unit may store information of a battle event, and the control unit may provide a predetermined reward to a group participating in the battle event according to victory or defeat (win or loss) in the battle event, and retain (save, accumulate) the reward in the group as the compensation for the transfer.

For example, the "reward" has such an effect that gives an advantage to each player or the group to which the player belongs over the opponent group, each opponent player belonging to the opponent group, or an individual opponent player in the battle event. Alternatively, the possession of the "reward" leads to higher value. Typically, the types of rewards are not particularly limited. Examples of the "reward" include various items (including parameter values such as points) for increasing the player's offensive power, various items for recovering the player's health points or recovering from damage, and items that themselves have value or property such as rarity.

It is possible to obtain a resource for the compensation for the transfer through the activity of the whole group, by winning the battle event. Therefore, both the transferring player (the first player) and the group (e.g. the second group as the transfer destination group) that pays the compensation for the transfer are motivated to participate in the battle event. Besides, the transfer of players between groups is promoted more actively.

Alternatively, the information storage unit may store information of a battle event, and the control unit may determine contribution of the player in the battle event, provide a predetermined reward in association with the player according to the contribution, and retain the reward in the group as the compensation for the transfer. For example, the control unit may numerically evaluate, for each player, how much the player has damaged enemy characters or opponent players in the battle event, and determine the player's contribution based on the numerical value. Here, the numerical value may be weighted according to the formidableness of each enemy character or opponent character.

Such a structure is useful in the mode in which the transferring player acquires the resource for the compensation for the transfer on his or her own and save the resource. Hence, the player can earn something like severance pay in the battle event. This further motivates the transferring player (the first player) to participate in the battle event, and further promotes the transfer of players between groups.

Moreover, to keep the resource for the compensation for the transfer, the control unit may retain at least a part of a game medium possessed by the player in the group as the compensation for the transfer, based on or regardless of the player's will. A specific example is that, in the case where the player possesses points, coins, items, and the like usable in the game, the player donates his or her possessions to the group to which the player belongs or accumulates his or her possessions in the group.

Moreover, the control unit may enable the first player to transfer, when a second player belonging to the second group presents the compensation for the transfer and makes an offer for the transfer to the first player belonging to the first group (i.e. invites the first player to transfer to the second group). In this way, the second group as the transfer destination group can more reliably invite the first player whom the second group wants, to transfer to the second group. In addition, the transferring first player can transfer to the second group with a better condition.

Preferably, after the first player transfers to the second group, the control unit may prohibit further transfer of the first player for a predetermined period. This prevents cheating where the first player who has transferred to the second group as the transfer destination group acquires a large amount of transfer compensation unjustly by repeating transfer in a short time without substantially contributing to the second group.

A control method for a server device disclosed herein is a method for effectively controlling the server device described above. The control method is a control method for a server device that comprises: an information storage unit for storing information related to a game in which a plurality of players are able to participate; and a control unit for accessing the information and executing an operation related to the game.

In this method, information of a plurality of groups associated with the plurality of players is stored in the information storage unit, as a part of the information related to the game. The control unit then executes a control process of setting the game so as to enable a first player belonging to a first group out of the plurality of groups to transfer to a second group different from the first group and, when the first player transfers from the first group to the second group, performing payment and receipt of compensation for the transfer between at least two out of the first player, the first group, and the second group.

A game system disclosed herein is a system comprising: a terminal device operated by a player as mentioned above; and a server device that is connected to the terminal device via a communication line and provides a game in which a plurality of players are able to participate. The server device may comprise: an information storage unit for storing information related to the game; and a control unit for accessing the information and executing an operation related to the game. In this system structure, the information storage unit stores information of a plurality of groups associated with the plurality of players, as a part of the information related to the game. The control unit performs, when a first player transfers from a first group to a second group, payment and receipt of compensation for the transfer between at least two out of the first player, the first group, and the second group. A computer-readable recording medium disclosed herein has recorded therein a process for causing a computer to execute the following steps: storing, as a part of information related to a game in which a plurality of players are able to participate, information of a plurality of groups associated with the plurality of players; accessing the information and executing an operation related to the game; setting the game so as to enable a first player belonging to a first group out of the plurality of groups to transfer to a second group different from the first group; and performing, when the first player transfers from the first group to the second group, payment and receipt of compensation for the transfer between at least two out of the first player, the first group, and the second group.

According to embodiments of the invention, when a player transfers between groups, payment and receipt of compensation for the transfer are performed between at least two out of: the groups involved in the transfer (the first group as the transfer source and the second group as the transfer destination); and the transferring player (the first player). This promotes the transfer (movement) of players between groups, and enhances the mobility of players (game participants) in the game. As a result, the whole social game and SNS can be made more active.

DETAILED DESCRIPTION

Figure 1:
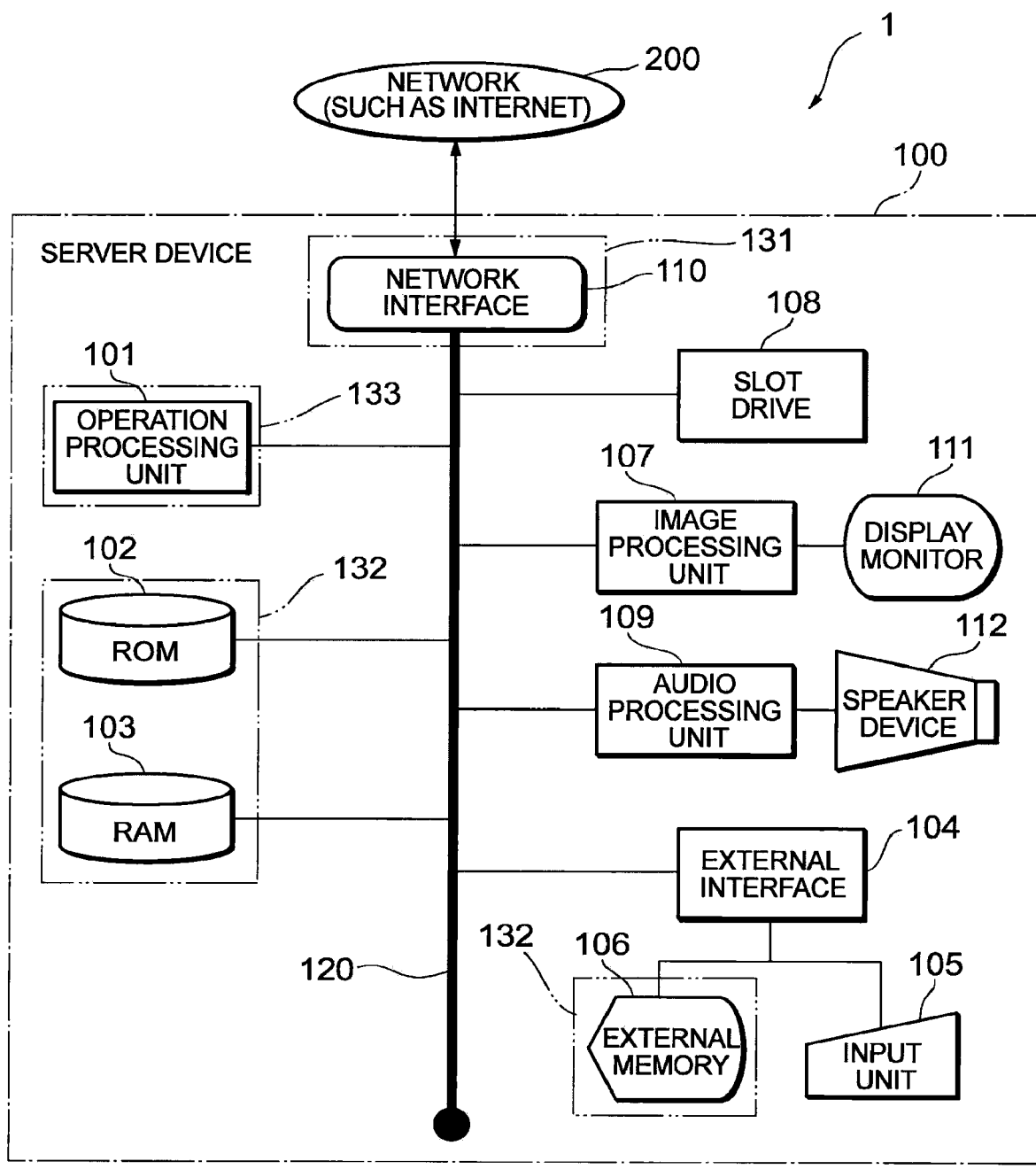
FIG. 1 is a schematic diagram (system block diagram) showing a preferred embodiment of a game system according to the invention.

The following describes an embodiment of the invention in detail. The following embodiment is merely illustrative of the invention, and the invention should not be limited to the embodiment. Various modifications are possible in the invention, without departing from the scope of the invention. Moreover, a person skilled in the art can adopt any embodiment in which one or more elements described below are replaced with their equivalents, and such an embodiment is also included within the scope of the invention. The positional relationships such as up, down, left, and right shown according to need are based on the positional relationships shown in the drawings, unless stated otherwise. The dimensional ratios in the drawings are not limited to the ratios shown in the drawings. Though the following describes, as an example, an embodiment in which the invention is implemented using an information processing device for a game to facilitate understanding, this is not a limit for the invention as noted above.

Figure 2:
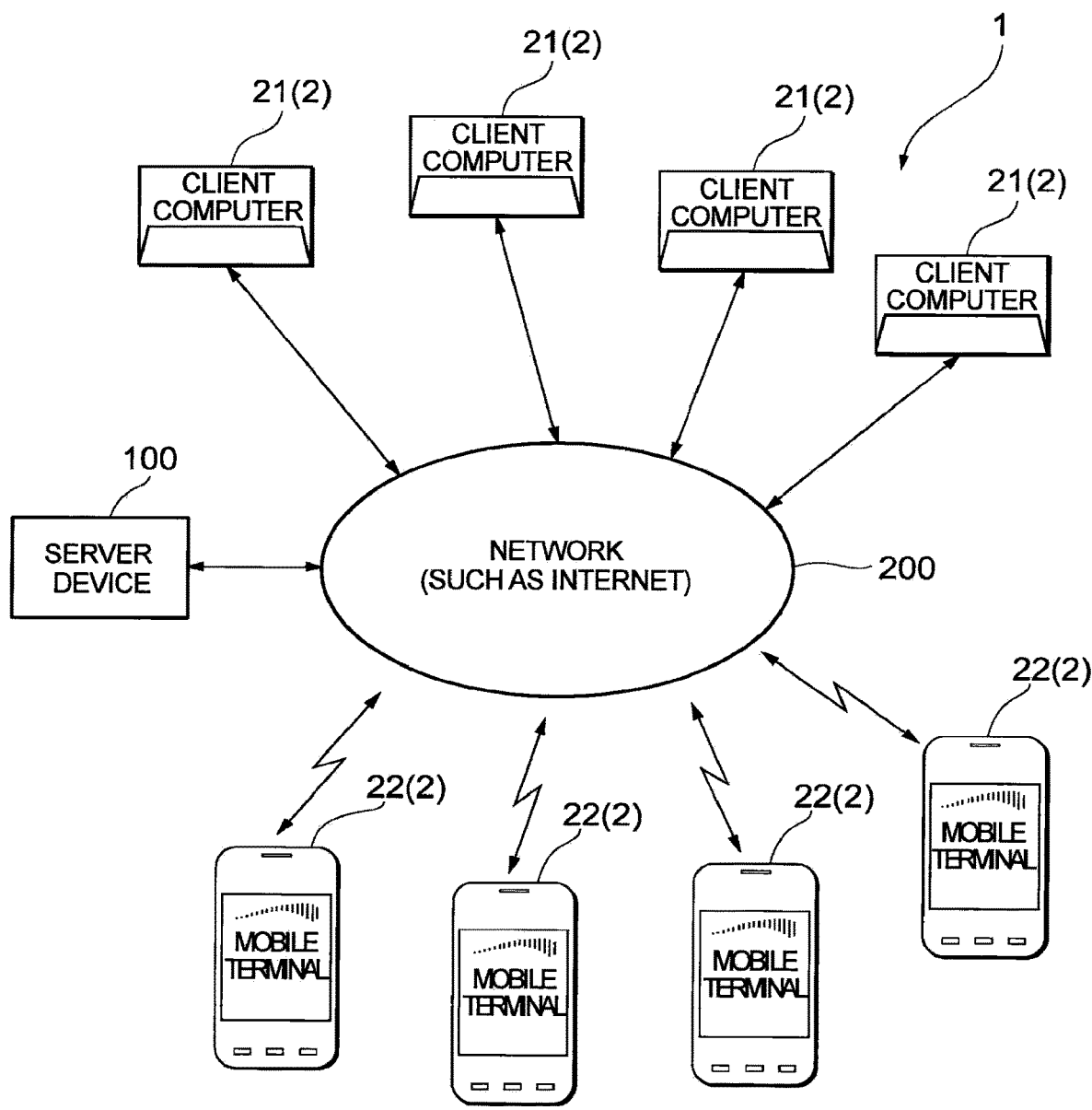
FIG. 2 is a schematic diagram (system diagram) showing the preferred embodiment of the game system.

FIGS. 1 and 2 are schematic diagrams (a system block diagram and a system diagram, respectively) showing a preferred embodiment of a social game system as a game system disclosed herein. As shown in these drawings, a server device 100 included in a social game system 1 (game system) is a server computer connected to a network 200, and achieves a server function by a predetermined server program running in the server computer. Each terminal device 2 such as a client computer 21 or a mobile terminal 22 is wiredly and/or wirelessly connected to the network 200, as with the server device 100. The server device 100 and the terminal device 2 are set to be capable of communicating with each other, thus constituting the social game system 1. Note that the server device 100 itself is also an example of a social game system disclosed herein.

The network 200 is a communication line or a communication network for information processing such as the Internet. The specific structure of the network 200 is not particularly limited so long as it enables data transmission and reception between the server device 100 and the terminal device 2. For example, the network 200 comprises a base station wirelessly connected to the terminal device 2, a mobile communication network connected to the base station, the Internet connected to the server device 100, and a gateway device for connecting the mobile communication network and the Internet.

[Hardware Structure of Server Device]

In the server device 100, an operation processing unit (computing unit) 101 such as a CPU or an MPU, a ROM 102 and a RAM 103 as storage devices, an external interface 104 connected with an input unit 105 and an external memory 106, an image processing unit 107 connected with a display monitor 111, a slot drive 108 containing or connected with a disk, a memory device, and the like, an audio processing unit 109 connected with a speaker device 112, and a network interface 110 are connected to each other via a transmission path 120 such as a system bus including an internal bus, an external bus, and an expansion bus for example. Note that devices used for input/output such as the input unit 105, the external memory 106, the display monitor 111, and the speaker device 112 may be omitted according to need and, even in the case of being included, need not be constantly connected to the transmission path 120.

The operation processing unit 101 comprises one or more processors and peripheral circuits thereof. The operation processing unit 101 executes integrated control for the overall operation of the server device 100, transmits and receives control signals and information signals (data) with the other components mentioned above, and also performs various operations necessary for game execution. The operation processing unit 101 is accordingly capable of performing, through the use of an arithmetic logic unit and the like, arithmetic operations such as addition, subtraction, multiplication, and division, logical operations such as logical addition, logical multiplication, and logical negation, bit operations such as bit addition, bit multiplication, bit inversion, bit shift, and bit rotation, and the like, on a fast-accessible storage area such as a register. The operation processing unit 101 is further capable of performing saturate operations, trigonometric function operations, vector operations, and the like, according to need. Note that the operation processing unit 101 can execute a plurality of programs in parallel.

The ROM 102 stores an IPL (Initial Program Loader), which is typically executed immediately after power-on. By executing the IPL, the operation processing unit 101 reads, into the RAM 103, various programs and various data recorded in the disk or the memory device contained in or connected to the slot drive 108, and executes the programs. The ROM 102 may also store an operating system program necessary for controlling the overall operation of the server device 100, various application programs (including a driver program, a server program, a game program, etc.), and various data (such as data necessary for game progress and communication between a plurality of terminal devices 2).

The RAM 103 is for temporary storage of programs and data, and retains various programs and various data read by the operation processing unit 101 as described above. The above-mentioned operating system program, various application programs (including a driver program, a server program, a game program, etc.), and various data may be recorded in the RAM 103. The operation processing unit 101 executes processes such as setting a variable area in the RAM 103 and performing an operation directly on a value stored in the variable area using the arithmetic logic unit, copying or moving a value of data stored in the RAM 103 to a register and performing an operation directly on the register, and writing the operation result back to the RAM 103.

The input unit 105, connected via the external interface 104, receives various operation inputs by the user (SNS provider or game provider) of the server device 100. The input unit 105 may be any of a keyboard, a touchpad, a touch panel, a voice input device, and the like. The device type is not particularly limited so long as various operation inputs and instruction inputs for a decision operation, a cancel operation, a menu display, and the like are possible.

The RAM 103 or the external memory 106 which is removably connected via the external interface 104 stores data indicating the operation status of the server device 100, the access status of each terminal device 2, and the play status and progress state (past results, etc.) of the game in each terminal device 2, data of communication logs (records) between the terminal devices 2, and so on, in a rewritable form. Examples of the external memory 106 include a flash memory, a magnetic disk device, an optical disc device, and a magnetic tape device.

The image processing unit 107, after various data read from the slot drive 108 is processed by the operation processing unit 101 or the image processing unit 107, stores the processed image information in a frame memory or the like. The image information stored in the frame memory is converted to a video signal at a predetermined synchronization timing, and output to the display monitor 111 connected with the image processing unit 107. This enables various image displays. Image information related to the game is transmitted from the image processing unit 107 and/or the operation processing unit 101 to each terminal device 2, for example in cooperation with the operation processing unit 101.

The audio processing unit 109 converts various data read from the slot drive 108 to an audio signal, and outputs the audio signal from the speaker device 112 connected with the audio processing unit 109. Audio information (sound effects, music information) related to the game is transmitted from the audio processing unit 109 and/or the operation processing unit 101 to each terminal device 2, for example in cooperation with the operation processing unit 101.

The network interface 110 connects the server device 100 to the network 200. For example, the network interface 110 conforms to a standard used for building a LAN, and includes: an analog modem, an ISDN modem, an ADSL modem, a cable modem for connecting to the Internet or the like using a cable television line, or the like; and an interface (communication interface circuit) for connecting the modem to the operation processing unit 101 via the transmission path 120.

[Functional Structure of Server Device]

Figure 3:
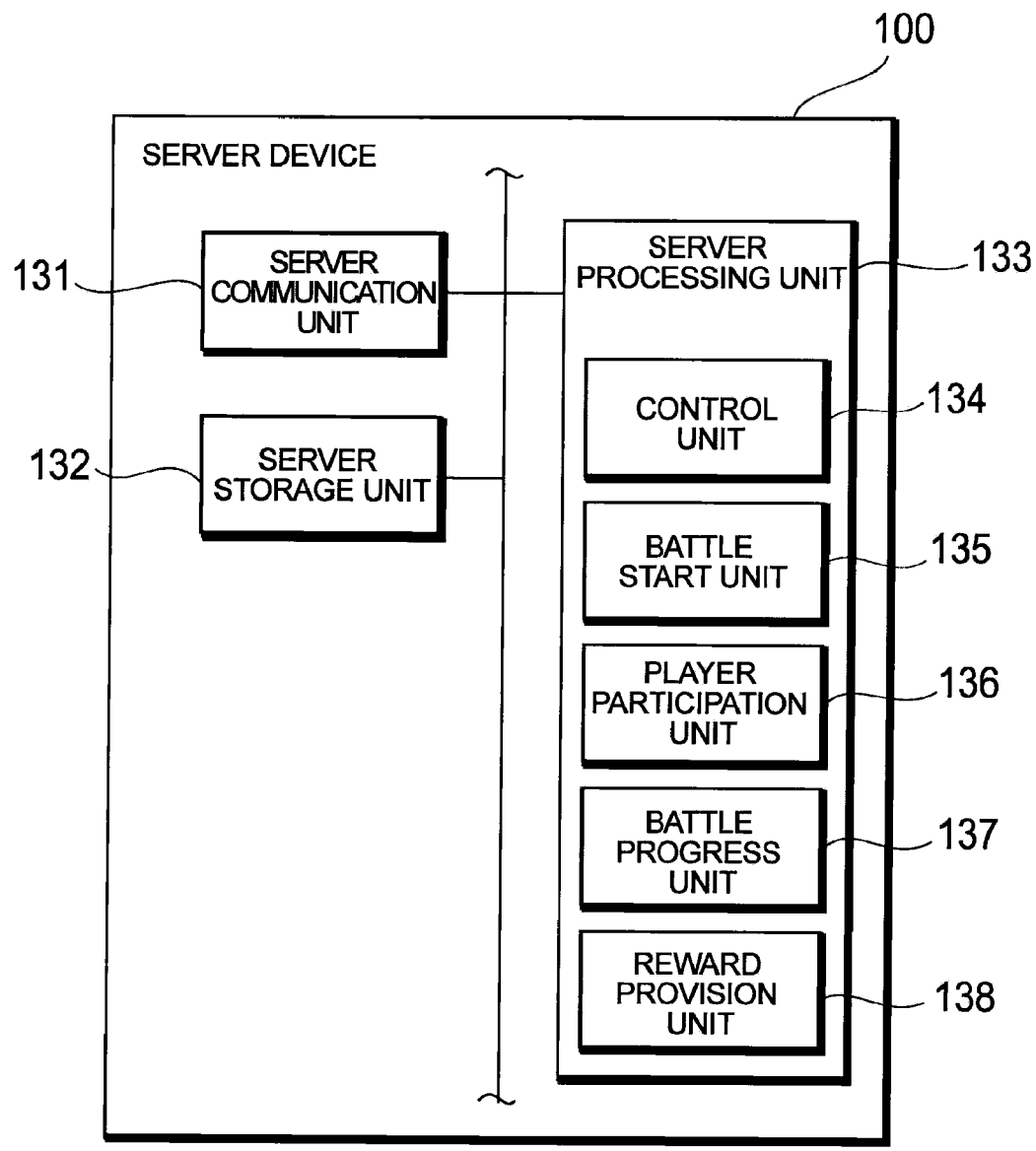
FIG. 3 is a schematic diagram (functional diagram) of a server device shown in FIGS. 1 and 2.

The hardware structure of the server device 100 is as described above. FIG. 3 is a schematic diagram (functional diagram) showing the server device 100 in FIGS. 1 and 2 from a functional point of view. The server device 100 has the game progress according to a request by the player of the terminal device 2 and, as functions for this purpose, comprises at least a server communication unit 131, a server storage unit 132, and a server processing unit 133.

The server communication unit 131 performs communication between the server device 100 and the network 200, and has a function of supplying data received from the terminal device 2 and the like to the server processing unit 133 and transmitting data supplied from the server processing unit 133 to the terminal device 2. Specifically, the server communication unit 131 is composed of at least the above-mentioned network interface 110 shown in FIG. 1 (see FIG. 1).

The server storage unit 132 stores various programs and various data. Specifically, the server storage unit 132 is composed of at least one of the above-mentioned ROM 102, RAM 103, and external memory 106 shown in FIG. 1. Here, the game program stored in the server storage unit 132 is an application program including battle events which are inter-group events. The server storage unit 132 also stores display data and battle result data related to the battle events.

The server storage unit 132 further stores, as data, a battle event management table for managing battle events, a player management table for managing players, a game medium management table for managing game media such as items, a group management table for managing groups to which the players belong, an enemy management table for managing characters such as enemy characters other than the players according to need, and so on. In addition, the server storage unit 132 may temporarily store temporary data related to a predetermined operation in the server processing unit 133. The management tables are associated with each other using player IDs and the like, according to need. These data include information of "a plurality of groups associated with players", "a battle event which is an inter-group event executed by the plurality of groups", and "normal skills and special skills which can be exercised by players over opponent players belonging to an opponent group in the battle event and each of which has a predetermined property".

The server processing unit 133 is composed of the operation processing unit 101 shown in FIG. 1, and comprises a control unit 134, a battle start unit 135, a player participation unit 136, a battle progress unit 137, and a reward provision unit 138 as functional modules. These units (functional modules) may be realized by the above-mentioned various programs executed by the processor in the operation processing unit 101, or implemented in the operation processing unit 101 as firmware. The operations of these units will be described later.

[Hardware and Functional Structure of Terminal Device]

Figure 4:
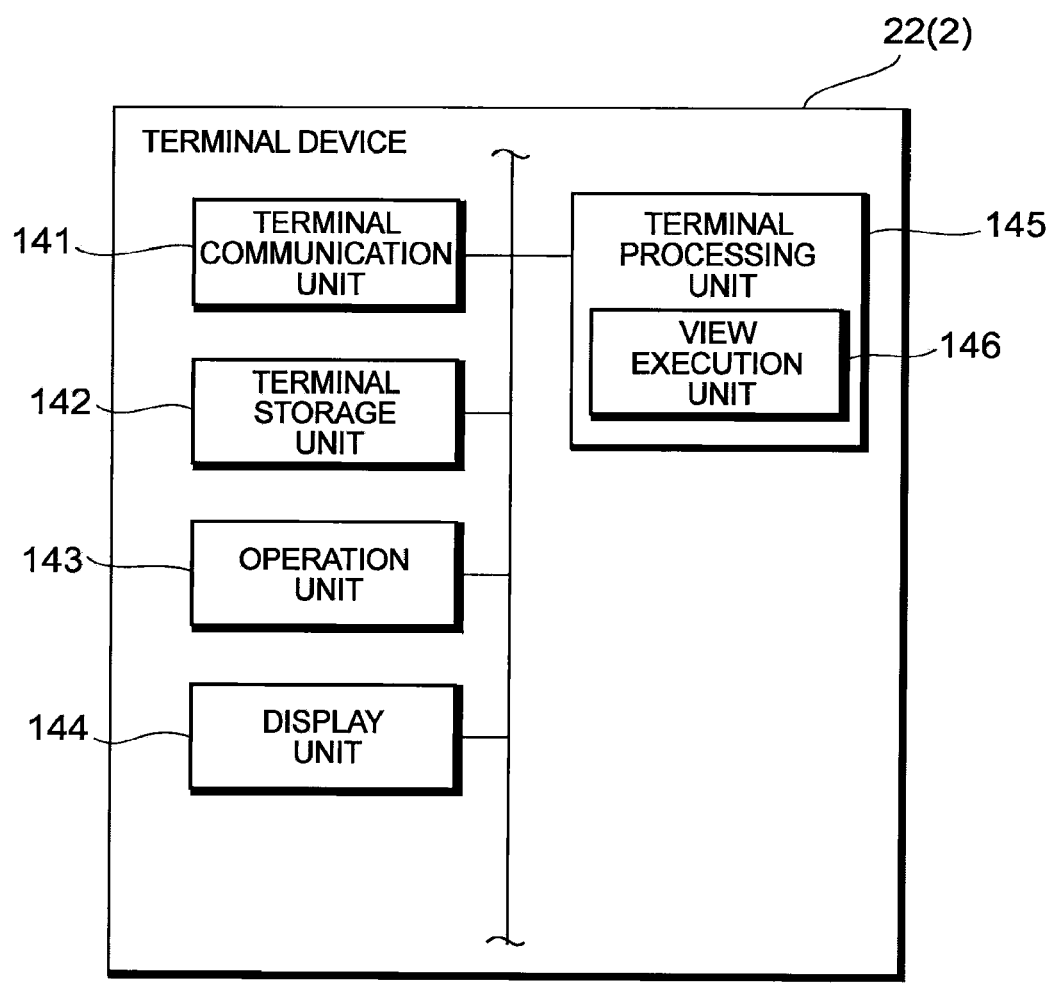
FIG. 4 is a schematic diagram (functional diagram) of a terminal device shown in FIG. 2.

FIG. 4 is a schematic diagram of the terminal device 2 shown in FIG. 2, and is a functional diagram from a functional point of view. For example, the terminal device 2 is the mobile terminal 22 as mentioned above. Examples of the mobile terminal 22 include a multifunctional mobile phone (called a "smartphone"), a mobile phone (called a "feature phone"), a mobile information terminal (Personal Digital Assistant: PDA), a mobile game machine, a portable music player, and a tablet PC. The terminal device 2 comprises a terminal communication unit 141, a terminal storage unit 142, an operation unit 143, a display unit 144, and a terminal processing unit 145.

The terminal communication unit 141 comprises a communication interface circuit including an antenna whose sensitivity band is a predetermined frequency band, and connects the terminal device 2 to the network 200 via a wireless communication network. The communication form in this case is not particularly limited. For example, the terminal communication unit 141 establishes, through a channel assigned by a base station for communication or the like, a wireless signal line by WCDMA® (Wideband Code Division Multiple Access) or the like with the base station, and communicates with the base station. The terminal communication unit 141 transmits data supplied from the terminal processing unit 145 to the server device 100, and supplies data received from the server device 100 to the terminal processing unit 145.

The terminal storage unit 142 comprises at least one of a flash memory, a magnetic disk device, and an optical disc device, for example. The terminal storage unit 142 stores an operating system program, a driver program, an application program, data, and the like used in processes in the terminal processing unit 145. Examples of the driver program include an input device driver program for controlling the operation unit 143 and an output device driver program for controlling the display unit 144. Examples of the application program include a program for acquiring and displaying display data of images related to game progress. Examples of the data include display data, video data, image data, and the like related to game progress. The terminal storage unit 142 may temporarily store temporary data related to a predetermined process.

The operation unit 143 may be any device that is capable of operating the terminal device 2 and enables the player to input letters, numbers, and so on. Examples of the operation unit 143 include a touch panel, a touchpad, and a keyboard. When the player operates the operation unit 143, the operation unit 143 generates a signal corresponding to the operation, and supplies the signal to the terminal processing unit 145. The terminal device 2 transmits the operation signal by the player to the server device 100 via the terminal communication unit 141, to request an operation necessary for game progress.

The display unit 144 displays video corresponding to video data supplied from the terminal processing unit 145, an image corresponding to image data supplied from the terminal processing unit 145, or the like, and constitutes a main part of a screen 2a of the terminal device 2 described later. The display unit 144 may be any device that is capable of displaying text, video, images, and so on. Examples of the display unit 144 include a liquid crystal display and an organic EL (Electro-Luminescence) display.

The terminal processing unit 145 comprises one or more processors such as a CPU and an MPU and peripheral circuits thereof, and executes integrated control for the overall operation of the terminal device 2. For example, the terminal processing unit 145 may have the same structure as the operation processing unit 101 in the server device 100 described above. The terminal processing unit 145 controls the operations of the terminal communication unit 141, the display unit 144, and the like so that various processes in the terminal device 2 are executed in appropriate procedures along the programs (the operating system program, the driver program, the application program, etc.) stored in the terminal storage unit 142 and according to the operation of the operation unit 143 and the like.

The terminal processing unit 145 comprises at least a view execution unit 146. The view execution unit 146 is, for example, a functional module realized by the above-mentioned various programs or a functional module implemented in the terminal device 2 as firmware. The view execution unit 146 performs the acquisition and display of display data related to game progress mentioned earlier. In detail, the view execution unit 146 transmits a request to acquire display data related to game progress to the server device 100 via the terminal communication unit 141, according to an instruction by the player. The view execution unit 146 then receives the corresponding display data from the server device 100 via the terminal communication unit 141. The view execution unit 146 generates rendering data based on the received display data. That is, the view execution unit 146 analyzes the received display data to specify control data and content data, and lays out the specified content data according to the specified control data. The view execution unit 146 thus reconstructs rendering data, and outputs the rendering data to the display unit 144.

[Timetable of Game]

Figure 5:
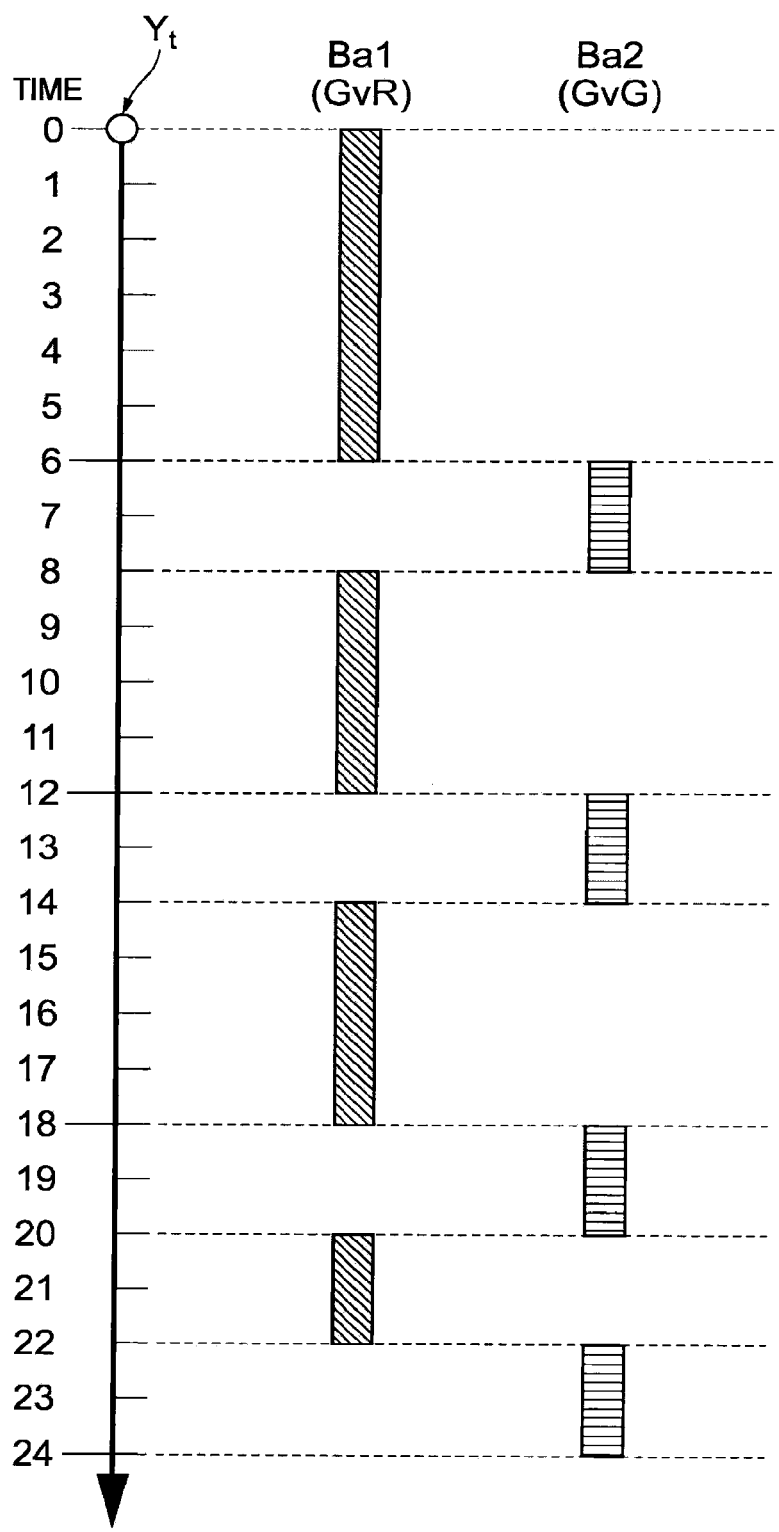
FIG. 5 is a conceptual diagram showing an example of a timetable of a game performed in the server device shown in FIGS. 1 and 2.

The following describes a preferred embodiment of a game (social game) performed through a game program disclosed herein in the social game system 1 having the structure described above. FIG. 5 is a conceptual diagram showing an example of a timetable of a game performed in the social game system 1.

Various processes (display of images and screens, determination, operations, etc.) in the following procedure are executed based on control commands by the operation processing unit 101 (the server processing unit 133) in the server device 100. That is, the operation processing unit 101 (the server processing unit 133) functions as the "control unit" in the invention. Each storage medium (the server storage unit 132) storing game-related information in addition to the above-mentioned ROM 102, RAM 103, and external memory 106 correspond to the "information storage unit" in the invention.

The game comprises different battle events Ba1 and Ba2. In this embodiment, any of the battle events Ba1 and Ba2 is continuously performed from 0:00 to 24:00 with no interruption, as shown in a time axis Yt in FIG. 5. The server device 100 is in a state of being capable of distributing these battle events Ba1 and Ba2 to the terminal device 2 of the player, according to a preset schedule and time-series algorithm.

The player operates the terminal device 2 (the client computer 21 or the mobile terminal 22, e.g. a tablet terminal or a smartphone), to connect the terminal device 2 to the server device 100 via the network 200 such as the Internet. The player also operates the terminal device 2 to select the game provided from the server device 100 or, in a platform screen prior to game selection, input login information such as an ID number and a password. Having recognized the login information, the operation processing unit 101 in the server device 100 displays the player's unique My Page screen or My Home screen associated with the ID number, on the terminal device 2.

Depending on the game type, a banner listing a plurality of scenes (e.g. locations, dungeons, quests, etc.) set as game scenes is displayed in the My Page screen. The scenes such as locations, dungeons, and quests may be mutually or individually hierarchized.

Moreover, in this game, the operation processing unit 101 in the server device 100 displays a menu screen about the above-mentioned "guild" that is a group to which an individual player belongs, in the My Page screen or the My Home screen. A player who has played the game or participated in the game basically belongs to a predetermined guild. This information is stored in the information storage unit such as the ROM 102, in association with specific information such as the ID information of the player. Based on this information, the operation processing unit 101 displays information of the guild to which the player belongs and, if necessary, an edit menu and the like for the guild, on the terminal device 2.

On the other hand, a player who plays the game or participates in the game for the first time basically does not belong to a specific guild. The operation processing unit 101 accordingly displays a menu screen for searching for (finding) a guild or creating (establishing) a new guild, on the terminal device 2 of the player not belonging to any guild. The player can decide or create a guild to which he or she joins, by operating the terminal device 2 according to instructions in pull-down menus and the like sequentially displayed from the menu screen.

After the guild to which the player belongs is decided or selected, a list of a plurality of games or events is displayed on the terminal device 2 according to need. When the player selects to participate in the game, a screen of a game event held at the time is displayed on the terminal device 2 of the player. Thus, the player can freely participate in the game event held at the time. Here, a preparation screen or an introduction screen of the game event may be displayed on the terminal device 2 of the player, as a still image or a moving image (e.g. Flash).

In the example shown in FIG. 5, the server device 100 continuously executes any of the battle events Ba1 and Ba2 as mentioned earlier. For instance, in the case where the login time to the game is any of 0:00 a.m. to 6:00 a.m., 8:00 a.m. to 12:00 a.m., 2:00 p.m. to 6:00 p.m., and 8:00 p.m. to 10:00 p.m., the battle event Ba1 is held in the game community. In the case where the login time to the game is any of 6:00 a.m. to 8:00 a.m., 12:00 a.m. (noon) to 2:00 p.m., 6:00 p.m. to 8:00 p.m., and 10:00 p.m. to 12:00 p.m. (0:00 a.m. of the next day), the battle event Ba2 is held in the game community. The operation processing unit 101 executes the process of the battle event Ba1 or Ba2 to be held, based on the predetermined schedule.

Of these battle events Ba1 and Ba2, the battle event Ba1 is a raid battle, e.g. a fight between a guild G1 (group) to which a player belongs and a raid which is an enemy character (a battle corresponding to GvR mentioned earlier). Meanwhile, the battle event Ba2 is a guild battle, e.g. a fight between guilds G1 and G2 (groups) to which players belong (a battle corresponding to GvG mentioned earlier).

For example, the operation sequence in the social game system 1 when the player participates in such a battle event is as follows. First, the player instructs the terminal device 2 to execute the program, via the operation unit 143 in the terminal device 2. The terminal device 2 starts the process based on the program. When instructed by the player to start the game or participate in the game via the operation unit 143 in the terminal device 2, the terminal processing unit 145 realized by the program transmits a request to acquire, for example, an introduction screen of a battle event, to the server device 100 via the terminal communication unit 141 in the terminal device 2 (step S100).

Upon receiving the request to acquire the introduction screen of the battle event from the terminal device 2 via the server communication unit 131 in the server device 100, the control unit 134 in the server processing unit 133 generates display data for displaying the introduction screen (step S101). The control unit 134 transmits the generated display data to the terminal device 2 via the server communication unit 131 (step S102). Upon receiving the display data of the introduction screen of the battle event from the server device 100 via the terminal communication unit 141, the terminal processing unit 145 generates rendering data based on the received display data. The terminal processing unit 145 outputs the generated rendering data to the display unit 144 in the terminal device 2, to display the introduction screen of the battle event (step S103).

When instructed by the player to participate in the battle event in the introduction screen via the operation unit 143 in the terminal device 2, the terminal processing unit 145 transmits a request to acquire a game screen (e.g. a screen shown in FIG. 6 described later) for this, to the server device 100 via the terminal communication unit 141 (step S104). Upon receiving the request to acquire the game screen from the terminal device 2 via the server communication unit 131, the server processing unit 133 generates display data for displaying the game screen (step S105). The server processing unit 133 transmits the generated display data to the terminal device 2 via the server communication unit 131 (step S106).

Upon receiving the display data from the server device 100 via the terminal communication unit 141, the terminal processing unit 145 generates rendering data based on the received display data. The terminal processing unit 145 outputs the generated rendering data to the display unit 144 in the terminal device 2, to display the game screen (step S107). When instructed by the player to progress in the participation in the battle event in the game screen via the operation unit 143 in the terminal device 2, the terminal processing unit 145 transmits a request to acquire a game screen for this, to the server device 100 via the terminal communication unit 141 (step S108).

Upon receiving the request to acquire the game screen from the terminal device 2 via the server communication unit 131, the server processing unit 133 has the battle event progress based on the instruction by the player included in the received game screen acquisition request and the state of the game stored in the server storage unit 132 (step S109).

Figure 6:
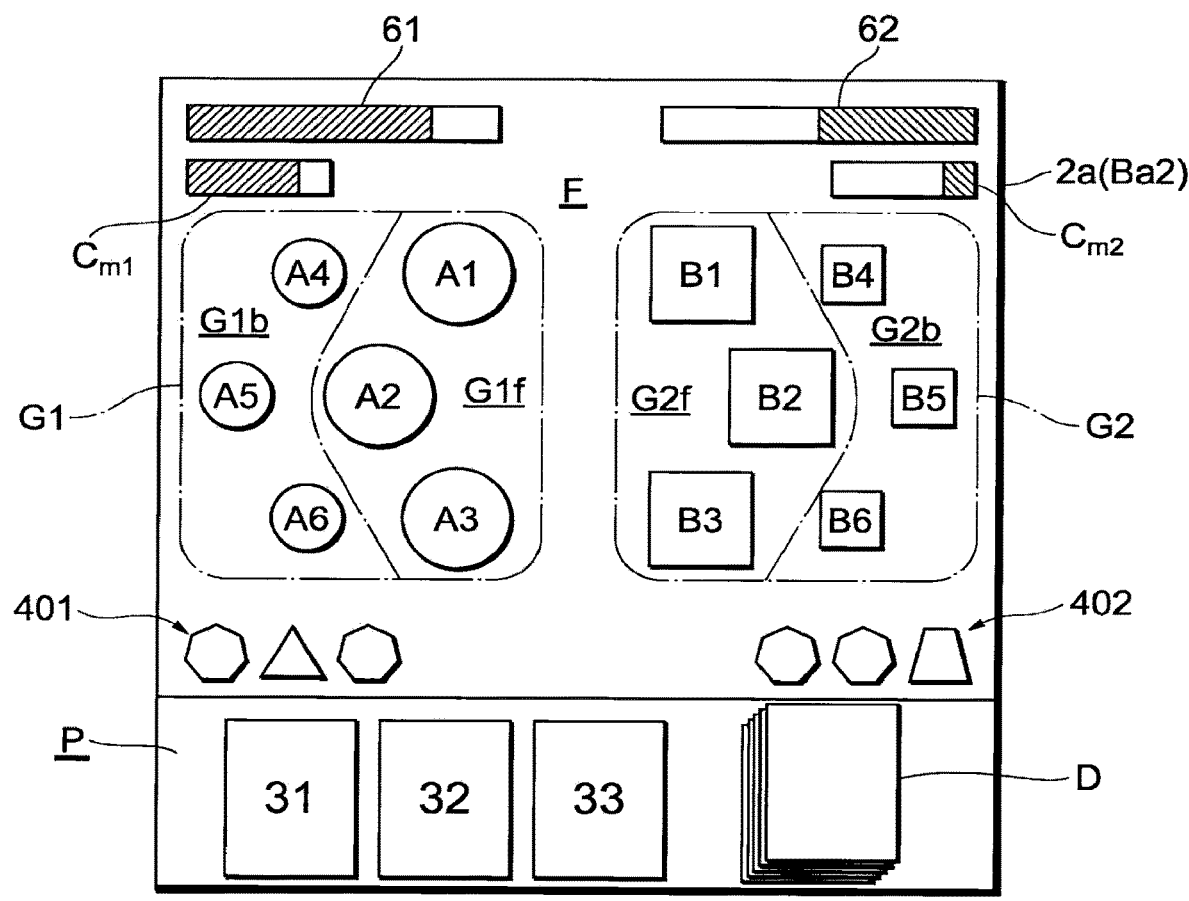
FIG. 6 is a schematic diagram showing an example of a structure of a game screen in the game shown in FIG. 5.

An example of a state when executing the battle event Ba2 (GvG: guild battle) displayed on the terminal device 2 of each player is described below, with reference to FIG. 6. FIG. 6 is a schematic diagram showing an example of a structure of a game screen in the social game shown in FIG. 5. In the procedure in the battle event Ba2 (also referred to as "quest" or the like depending on the game title, the same applies to the battle event Ba1), first, an event field F and a palette P are defined as game image display areas in the screen 2a of the terminal device 2, and each element is displayed in these display areas, as shown in FIG. 6.

In detail, player characters A1 to A6 (players) belonging to the guild G1 (group) and player characters B1 to B6 (opponent players) belonging to the guild G2 (opponent group) are displayed in the event field F, as part of elements. Here, an area (a main field of the guild G1) in which the player characters A1 to A6 of the guild G1 are displayed and an area (a main field of the guild G2) in which the player characters B1 to B6 of the guild G2 are displayed are mainly defined in the event field F. The player characters A1 to A6 belonging to the guild G1 and the player characters B1 to B6 belonging to the guild G2 are each unified in directly fighting the opponent player characters of the opponent guild.

The main fields of the guilds G1 and G2 are respectively made up of subfields G1f and G1b and subfields G2f and G2b defined by the alternate long and short dashed lines. In this embodiment, of the player characters A1 to A6 belonging to the guild G1, the player characters A1 to A3 experienced in the game and having a high level attribute are located in the subfield G1f as a vanguard, whereas the player characters A4 to A6 less experienced in the game and having a low level attribute are located in the subfield G1b as a rearguard. Likewise, of the player characters B1 to B6 belonging to the guild G2, the player characters B1 to B3 experienced in the game and having a high level attribute are located in the subfield G2f as a vanguard, whereas the player characters B4 to B6 less experienced in the game and having a low level attribute are located in the subfield G2b as a rearguard.

In both of the guilds G1 and G2, only the player characters located in the vanguard are damaged by attack from the opponent player characters. Both the vanguard player characters and the rearguard player characters can participate in attack. This enables such a guild strategy that the player characters of the relatively experienced players cover for the player characters of the relatively inexperienced players.

The palette P is displayed on the screen 2a of the terminal device 2 of each of the player characters A1 to A6 of the guild G1, as the mode of the battle in the battle event Ba2. The palette P is an area for deciding, by lottery, "skills" (normal skills, special skills) usable when the player characters A1 to A6 of the guild G1 or the player characters B1 to B6 of the guild G2 attack the opponent player characters, as its elements. A deck D which is a virtual set of cards and a plurality of cards (game media) selected from the deck D are displayed in the palette P.

A type of "skill", a character, an illustration, a skill-related specific item, text, or the like representing the skill is drawn or written in each card. In addition, information of the skill, an offensive value (the points of the skill or exercised action, e.g. action points (AP) or skill points (SP)), a defensive value (which may be health points or life points (HP)), an attribute (color such as red, green, or blue, form such as fire, water, tree, or light, etc.), rarity (degree of rarity), and the like is set in each card. In the case where three cards 31, 32, and 33 sequentially turned over from the deck D and displayed by the player match in type, attribute, rarity, and the like or constitute a specific combination (hand), an effect such as increasing the offensive power or defensive power of the player characters A1 to A6 or B1 to B6 is achieved. Skills exercised by the selection or combination of the cards 31, 32, and 33 or related active items 401 and 402 are displayed respectively below the player characters A1 to A6 and B1 to B6 in the event field F.

When the player further turns over a card from the deck D in a state where the three cards 31, 32, and 33 are displayed in the palette P, one of the cards 31, 32, and 33 (e.g. the leftmost card 31 in the drawing) is deleted from the screen 2a, and the newly selected card is displayed. Here, such presentation that slides the deleted card 31 out of the palette P, slides the remaining cards 32 and 33 to the left, and slides the new card into the vacant space may be employed.

Each of the player characters A1 to A6 of the guild G1 attacks the player characters B1 to B6 of the opponent guild G2 by sequentially selecting (turning over) cards from the deck D in the palette P, and damage inflicted on the opponent and damage inflicted on the player character are calculated. The calculation is performed according to the combination of the skill, the offensive value, the specific item, the defensive value, the attribute, the rarity, and the like set in each of the cards 31, 32, and 33. The same display is made on the screen 2a of the terminal device 2 of each of the player characters B1 to B6 of the guild G2, to attack the player characters A1 to A6 of the opponent guild G1.

HP gauges 61 and 62 of the respective guilds G1 and G2 are displayed above the main fields of the guilds G1 and G2. Near each of the HP gauges 61 and 62, the number of times (i.e. combo count) the player characters A1 to A6 or B1 to B6 continuously attack the opponent player characters before attacked by the opponent player characters is displayed as a combo gauge Cm1 or Cm2. When the combo count displayed in the combo gauge Cm1 or Cm2 reaches a predetermined value or more, the skills exercised by the player characters A1 to A6 or B1 to B6 over the opponent player characters are strengthened. This causes more damage to the opponent player characters. In the battle event Ba2, whether the guild G1 or G2 has won is determined based on the remaining amount of each of the HP gauge 61 of the guild G1 and the HP gauge 62 of the guild G2 at the time of battle end.

In such a battle event Ba2 which is a guild battle (GvG), the player characters A1 to A6 or B1 to B6 of the guild G1 or G2 can check, from the technique and skill (normal skill, special skill) exercised by each opponent player character, the combat level, battle experience, possessed items, and the like of the opponent player character. This is also possible in the case where each player character in the guild can view the battle event Ba2 in which his or her guild is not participating. Accordingly, when there is a high ability (formidable) player character among the player characters of the opponent guild and the player character wants this high ability player character to transfer to his or her guild, for example, the transfer can be negotiated and completed in the following procedure.

[Player Character Transfer 1]

Figure 7:
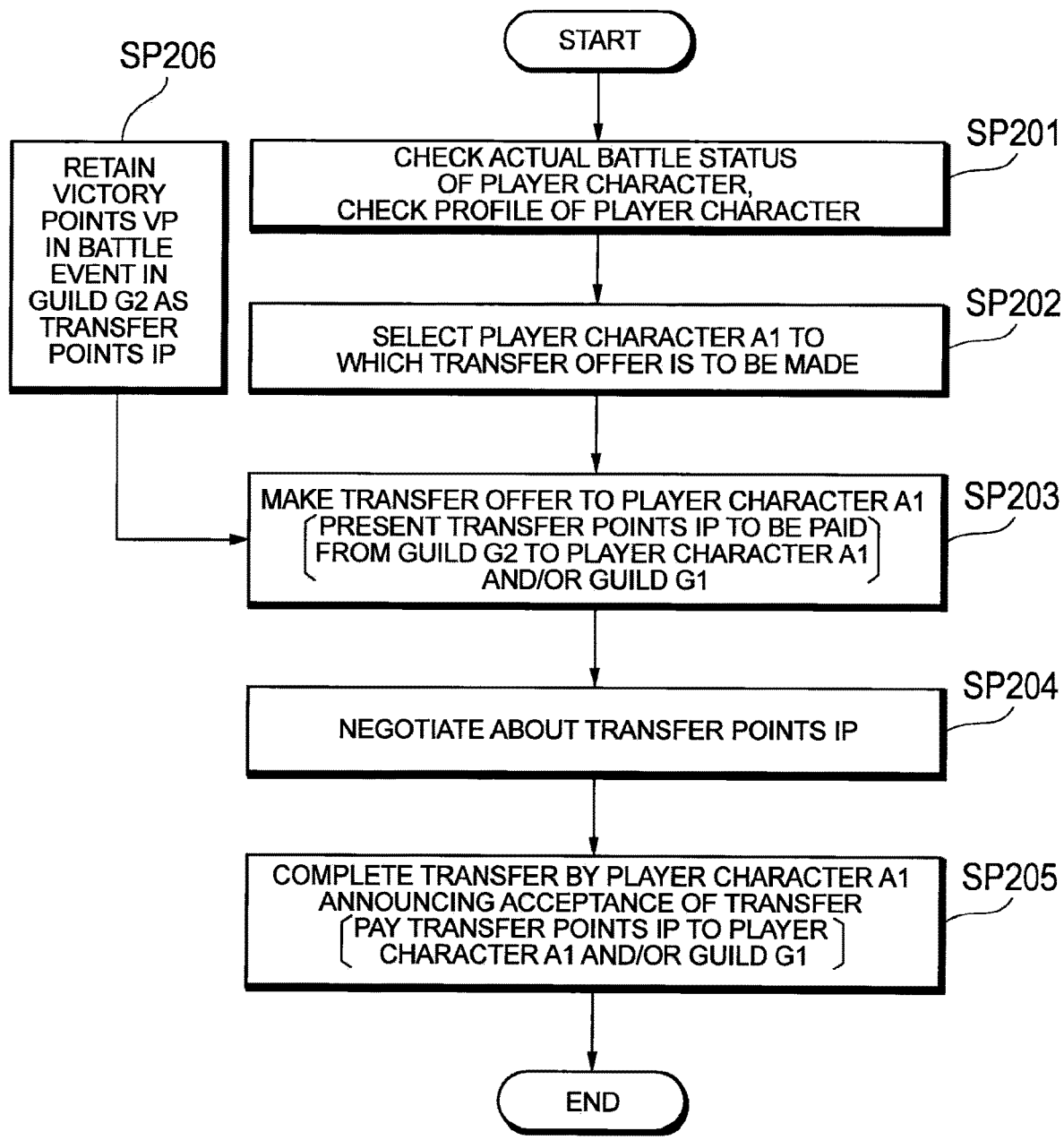
FIG. 7 is a schematic flowchart showing an example of a procedure in a mode in which a player character transfers between guilds.

FIG. 7 is a schematic flowchart showing an example of a procedure in a mode in which a player character transfers between guilds. This embodiment shows an example where the player character B1 (the second player) belonging to the guild G2 (the second group) negotiates with the player character A1 (the first player) belonging to the guild G1 (the first group) about the transfer. Upon the transfer of the player character A1, transfer points IP as compensation for the transfer are paid from the transfer destination guild G2 to the player character A1 and/or the transfer source guild G1.

The player characters A1 to A6 belonging to the guild G1 and the player characters B1 to B6 belonging to the guild G2 are appointed to a leader, a subleader, a normal member, and the like in each guild beforehand. Only those in limited positions are authorized to conduct player character transfer negotiation. As an example, the player character B1 who created the guild G2 is the leader of the guild G2, and can appoint the subleader and the like from the other player characters. For instance, only the player character B1 as the leader and the subleader are authorized to conduct transfer negotiation.

Each of the player characters B1 to B6 of the guild G2 can not only check the state of the battle (actual battle status) in the battle event Ba2, but also check the attribute (game level, possessions, etc.) of the player character A1 belonging to the guild G1 by viewing his or her profile data according to need (step SP201). As a result, the player character B1 as the leader of the guild G2 selects the player character A1 whom the player character B1 wants to be a member of the guild G2 to strengthen the guild G2 (step SP202). The selection may be made by the player character B1 as the leader alone, or made by the player character B1 consulting with the other player characters B2 to B6 of the guild G2 using an appropriate communication tool. Note, however, that only the player character B1 as the leader and the subleader can make a transfer offer to the player character A1 as mentioned above.

The player character B1 then invites the player character A1 to transfer from the guild G1 to the guild G2, using appropriate message transmission means such as a message board, chat, or e-mail or any other appropriate communication tool in SNS. When doing so, the player character B1 can present the predetermined transfer points IP to be paid from the guild G2 to the player character A1 and/or the transfer source guild G1, as the compensation for the transfer (step SP203). In other words, the player character B1 can present the predetermined transfer points IP to the player character A1, to make a transfer offer from the guild G1 to the guild G2.

When the transfer offer is made, the player character A1 checks the amount of the transfer points IP. If necessary, the player character A1 can negotiate with the player character B1 about the amount of the transfer points IP (step SP204). Whether or not to transfer to the guild G2 may be determined by the player character A1 alone. Alternatively, depending on the situation, the player character A1 may consult with the other player character A2 to A6 of the guild G1 regarding the transfer itself and/or the amount of the transfer points IP. Such negotiation or consultation may be omitted. In the case where the player character A1 accepts the transfer offer, the player character A1 announces the acceptance to the player character B1 using appropriate means, to complete the transfer. The transfer points IP are accordingly paid to the player character A1 and/or the guild G1 (step SP205). In the case where the transfer points IP are paid to the guild G1, the transfer points IP may belong to the guild G1, or be appropriately distributed among the members of the guild G1.

The transfer points IP to be paid to the player character A1 and/or the guild G1 can be saved (accumulated) in the guild G2 (step SP206). For example, victory points VP that can be acquired by the guild G2 when winning over the other guild in the battle event Ba2 are retained in the guild G2, to save the transfer points IP. That is, when the guild wins the battle event Ba2 more, the guild can prepare more transfer points IP to invite a high ability player character to transfer to the guild. This contributes to greater strength of the guild.

In this embodiment, the transfer points IP that can be acquired by the player character A1 and/or the guild G1 are allowed to be used in a specific event in which a specific game medium not acquirable or available in a normal event in the game can be acquired. For example, the "normal event" indicates purchase of a health point or life point recovery item or an offensive item usable in the battle event Ba2. Examples of the specific game medium not acquirable in the "normal event" include a card with extremely high rarity and a weapon or special skill with extremely high offensive power. The "specific event" is a transfer specific event (specific Gacha, specific Carddass, etc.). In detail, the victory points VP that can be acquired in the battle event Ba2 are unable to be used in the transfer specific event but, when used as (converted to) the transfer points IP, are able to be used in the transfer specific event. In other words, when associated with the act of transfer, the victory points VP that can be acquired in the battle event Ba2 change to the transfer points IP different in property.

[Player Character Transfer 2]

Figure 8:
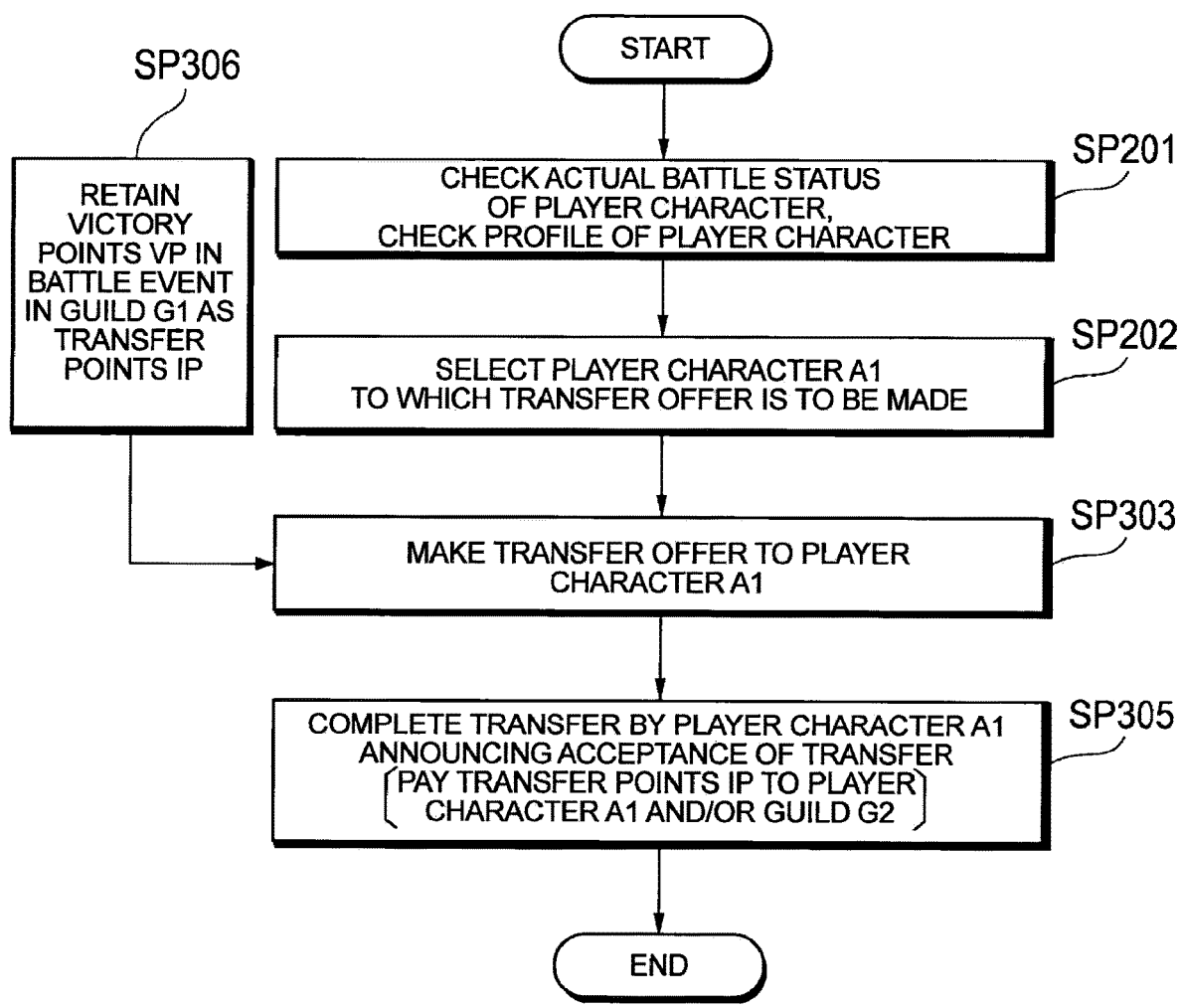
FIG. 8 is a schematic flowchart showing an example of a procedure in a mode in which a player character transfers between guilds.

FIG. 8 is a schematic flowchart showing another example of the procedure in the mode in which a player character transfers between guilds. The procedure in this embodiment is the same as that shown in FIG. 7, except that the transfer points IP as the compensation for the transfer are paid from the transfer source guild G1 to the player character A1 and/or the transfer destination guild G2 upon the transfer of the player character A1. In the procedure in this embodiment, step SP303 is executed instead of step SP203 shown in FIG. 7. In step SP303, the presentation of the transfer points IP is omitted. Accordingly, the negotiation about the transfer points IP in step SP204 shown in FIG. 7 is omitted, too.

The transfer points IP to be paid from the transfer source guild G1 to which the player character A1 belongs to the player character A1 and/or the transfer destination guild G2 can be saved by being retained in the guild G1 in association with the player character A1, for example according to the contribution (degree of contribution) of the player character A1 to the win by the guild G1 in the battle event Ba2 (step SP306). For instance, in the case where the guild G1 wins over the other guild in the battle event Ba2, the victory points VP that can be acquired by the guild G1 are proportionally distributed among the player characters according to the contribution of each player character to the win. Hence, the player character A1 can accumulate, in the guild G1 to which the player character A1 belongs, the transfer points IP related to the transfer of the player character A1 beforehand, and receive the transfer points IP like severance pay upon the transfer.

In the case where the player character A1 accepts the transfer offer, the player character A1 announces the acceptance to the player character B1 as the leader of the guild G2 using appropriate means, to complete the transfer. The transfer points IP are accordingly paid to the player character A1 and/or the guild G2 (step SP305). In the case where the transfer points IP are paid to the guild G2, the transfer points IP may belong to the guild G2, or be appropriately distributed among the members of the guild G2.

[Player Character Transfer 3]

In the embodiments shown in FIGS. 7 and 8, the player character A1 may voluntarily transfer to the guild G2. For example, information about whether or not the player character A1 wants to transfer, the amount of the transfer points IP requested by the player character A1 upon the transfer, the advantages (appeal points) of the transfer, and the like may be included in the profile of the player character A1. In this way, the player character A1 can offer the transfer to a guild leader or the like viewing the profile.

Furthermore, a community for interaction between player characters who want to transfer and guilds, a message board for transfer information, and the like may be prepared as the settings of the game or SNS, and used for transfer negotiation. In the case where the player character A1 wants to transfer to a specific guild, the player character A1 may notify the leader or subleader of the guild that the player character A1 wants to transfer to the guild, using an appropriate communication tool as mentioned above.

[Player Character Transfer 4]

In the embodiments shown in FIGS. 7 and 8, as the resource for the transfer points IP which is the compensation for the transfer of the player character A1, the points, coins, items, etc. (possessions) possessed by the player character A1 may be used instead of the victory points VP in the battle event Ba2. In such a case, the possessions of the player character A1 may be retained in the guild G1 as the transfer points IP, based on or regardless of the player character A1's will. The items and the like possessed by the player character A1 other than the points may be converted to transfer points IP at an appropriate rate, according to unique attributes set in the items and the like such as rarity and levels.

According to the social game system 1 having the structure described above, the control method for the social game system 1, and the game program, when the player character A1 transfers from the guild G1 to the guild G2, the transfer points IP as the compensation for the transfer are paid from the transfer source guild G1 or the transfer destination guild G2 to the player character A1 and/or the other guild G2 or G1. The transfer of the player character A1 between the guilds can therefore be promoted as compared with the case where there is no payment and receipt of such transfer points IP. This effectively prevents the members (constituent members) of the guilds G1 and G2 from being fixed. Since the mobility of players (game participants) in the game is enhanced, the social game and the SNS can be kept from becoming dull and made more active.

The player character A1 who has acquired the transfer points IP can acquire a rare item or the like not acquirable in the normal event, by using the transfer points IP in the transfer specific event. This further increases the player character A1's motivation for the transfer. The mobility of players is further enhanced in this way.

In the case where the transfer points IP are paid to the guild G1 or G2, if the transfer points IP belong to the guild G1 or G2, the guild G1 or G2 can execute the transfer specific event. If the transfer points IP are distributed among the members of the guild G1 or G2, on the other hand, each player character can execute the transfer specific event. This leads to increased interest or motivation for transfer for the player characters other than the transferring player character A1, too. As a result, the social game and the SNS can be made more active.

Moreover, the victory points VP provided to the guild that has won the battle event Ba2 may be used as the resource for the transfer points IP. Therefore, both the transferring player character A1 and the guild G1 or G2 that pays the transfer points IP are more motivated to participate in and fight the battle event Ba2. Besides, the transfer of players between the guilds G1 and G2 is more effectively promoted.

Alternatively, the victory points VP in the battle event Ba2 may be accumulated as the transfer points IP of the player character A1, according to the contribution of the player character A1 in the battle event Ba2. In this case, the player character A1 can earn something like severance pay upon the transfer. Hence, the player character A1 is more motivated to participate in and fight the battle event Ba2. The transfer of players between the guilds G1 and G2 is further promoted in this way. The player character A1 may donate or accumulate the points, coins, items, etc. (possessions) possessed by the player character A1, to or in the guild G1 as the transfer points IP. The player character A1 can thus save his or her possessions as severance pay upon the transfer. This enhances the activity of the player character A1 in the social game and the SNS, thus making the whole social game and SNS more active.

In the embodiments shown in FIGS. 7 and 8, the player character B1 in the transfer destination guild G2 may make the transfer offer to the player character A1 (invite the player character A1 to transfer to the guild G2). The player character B1 negotiates with the player character A1 about the transfer, to enable the transfer. Thus, in the case where the guild G2 wants to acquire the player character A1, the guild G2 can more reliably invite the player character A1 to transfer to the guild G2. In addition, in the case where the transfer points IP are presented, the player character A1 may negotiate about the suitability of the amount of the transfer points IP. This enables the player character A1 to transfer to the guild G2 with a better condition.

In the case where the player character A1 transfers from the guild G1 to the guild G2, the player character A1 may be prohibited from returning to the guild G1 or further transferring to another guild for a predetermined period. This effectively prevents cheating where the player character A1 acquires a lot of transfer points IP unjustly by repeating transfer in a short time without substantially contributing to the transfer destination guild G2.

The invention is not limited to the foregoing embodiment and modifications, and various other modifications are possible without departing from the scope of the invention, as noted above. For example, the structure of the server device 100 shown in FIG. 1 is also applicable to each of the client computer 21 and the mobile terminal 22 as the terminal device 2, though they differ in throughput and the like. Conversely, the client computer 21 or the mobile terminal 22 may be used as the server device 100. That is, any computer device connected via the network 200 can function as the server device.

In the server device 100, a mass-storage device such as a hard disk or an SSD may be used to serve the same functions as the ROM 102, the RAM 103, the external memory 106, the memory device loaded in the slot drive 108, and the like. The storage device may or may not be subjected to redundancy by RAID or the like. Moreover, the storage device may not necessarily be connected to the operation processing unit 101 via the transmission path 120, and may be connected to, for example, another external device via the network 200 in cloud computing.

The network interface in each of the server device 100 and the terminal device 2 may be any of a wireless LAN device and a wired LAN device, which may be included inside or be an external device such as a LAN card. The terminal device 2 may be a game machine connectable to the network 200. Alternatively, the terminal device 2 may be an online karaoke machine.

The game settings in the battle events Ba1 and Ba2 are not limited to the specific example in the embodiments described above. For example, the battle events Ba1 and Ba2 are not limited to a battle between two guilds G1 and G2, and may be a battle between three or more guilds.

As described above, embodiments of the invention can enhance the mobility of players (game participants) in a game, thus making the whole social game and SNS more active. Embodiments of the invention can be widely and effectively used for all games (in particular, games having the element of social game) distributed, provided, and implemented especially in server-client network structures, all software- and hardware-related techniques for distribution, provision, and implementation of the games, and activities such as design, manufacture, and sales thereof.

DESCRIPTION OF REFERENCE NUMERALS

1: social game system (game system)
2: terminal device
2a: screen
21: client computer (terminal device)
22: mobile terminal (terminal device)
31, 32, 33: card
61, 62: HP gauge
100: server device
101: operation processing unit (control unit)
102: ROM (information storage unit)
103: RAM (information storage unit)
104: external interface
105: input unit
106: external memory
107: image processing unit
108: slot drive
109: audio processing unit
110: network interface
111: display monitor
112: speaker device
120: transmission path
131: server communication unit
132: server storage unit
133: server processing unit
134: control unit
135: battle start unit
136: player participation unit
137: battle progress unit
138: reward provision unit
141: terminal communication unit
142: terminal storage unit
143: operation unit
144: display unit
145: terminal processing unit
146: view execution unit
200: network (communication line)
401, 402: active item
A1 to A6: player character of guild G1
(A1: first player)
B1 to B6: player character of guild G2
(B1: second player)
Ba1, Ba2: battle event
Cm1, Cm2: combo gauge
D: deck
F: event field
G1: guild (first group)
G2: guild (second group)
G1f, G1b, G2f, G2b: subfield
IP: transfer point
VP: victory point
P: palette
Yt: time axis

What is claimed is:

1. A server device comprising:
a controller configured to
execute an operation related to a game in which a first player and a second player associated with a first group and a second group, respectively, are able to participate,
transmit display data for displaying a screen to a terminal device of the second player,
provide profile data of the first player, the profile data including information indicating a desire of the first player to transfer groups,
receive an operation by the second player indicating selection of the first player after the second player views the profile data of the first player, and
enable the first player to transfer to the second group based on the operation by the second player.

2. The server device according to claim 1, wherein the controller is configured to perform payment and receipt of compensation for the transfer between at least two out of the first player, the first group, and the second group when the first player transfers from the first group to the second group.

3. The server device according to claim 2, further comprising
a storage device configured to store, as a part of information related to the game, information of the first and second groups associated with the first and second players and the profile data.

4. The server device according to claim 3, wherein
the storage device stores information of a transfer specific event in which the first player is able to acquire a specific game medium, and
the controller is configured to allow the first player to use the compensation for the transfer in the transfer specific event.

5. The server device according to claim 3, wherein
the storage device stores information of a battle event, and
the controller is configured to provide a predetermined reward to one of the first and second groups participating in the battle event according to victory or defeat in the battle event, and retain the reward in the respective group as the compensation for the transfer.

6. The server device according to claim 3, wherein
the storage device stores information of a battle event, and
the controller is configured to determine contribution of the first player in the battle event, provide a predetermined reward in association with the first player according to the contribution, and retain the reward in the first group as the compensation for the transfer.

7. The server device according to claim 2, wherein the controller is configured to retain at least a part of a game medium possessed by the first player in the first group as the compensation for the transfer, based on or regardless of the first player's will.

8. The server device according to claim 2, wherein the controller is configured to enable the first player to transfer to the second group, when the second player belonging to the second group presents the compensation for the transfer and makes an offer for the transfer to the first player belonging to the first group.

9. The server device according to claim 1, wherein, after the first player transfers to the second group, the controller is configured to prohibit further transfer of the first player for a predetermined period.

10. The server device according to claim 1, wherein
the profile data further includes a request by the first player as a condition for transfer.

11. The server device according to claim 1, wherein
the controller is further configured to provide a message board through which the second player makes an offer for the transfer to the first player.

12. A control method executed by a controller of a server device, the control method comprising:
executing an operation related to a game in which a first player and a second player associated with a first group and a second group, respectively, are able to participate;
transmitting display data for displaying a screen to a terminal device of the second player;
providing profile data of the first player, the profile data including information indicating a desire of the first player to transfer groups;
receiving an operation by the second player indicating selection of the first player after the second player views the profile data of the first player; and
enabling the first player to transfer to the second group based on the operation by the second player.

13. The control method according to claim 12, wherein
the profile data further includes a request by the first player as a condition for transfer.

14. The control method according to claim 12, further comprising providing a message board through which the second player makes an offer for the transfer to the first player.

15. A non-transitory computer-readable recording medium having recorded thereon a program code which, when executed by a computer, while a game is in progress in which a first player associated with a first group, and a second player using the computer and associated with a second group different from the first group, are able to participate, causes the computer to:
receive display data for displaying a screen;
display profile data of the first player, the profile data including information indicating a desire of the first player to transfer groups;
receive an operation by the second player indicating selection of the first player after the second player views the profile data of the first player; and
transmit information related to the selection.

16. The non-transitory computer-readable recording medium according to claim 15, wherein
the profile data further includes a request by the first player as a condition for transfer.

17. The non-transitory computer-readable recording medium according to claim 15, wherein the program code further causes the computer to
display a message board through which the second player makes an offer for the transfer to the first player, the offer being the information related to the selection.

18. A control method executed by a controller of a terminal device, the control method comprising:
executing an operation related to a game in which a first player associated with a first group, and a second player using the terminal device and associated with a second group, are able to participate;
receiving display data for displaying a screen;
displaying profile data of the first player, the profile data including information indicating a desire of the first player to transfer groups;
receiving an operation by the second player indicating selection of the first player after the second player views the profile data of the first player; and
transmitting information related to the selection.

19. The control method according to claim 18, wherein
the profile data further includes a request by the first player as a condition for transfer.

20. The control method according to claim 18, further comprising
displaying a message board through which the second player makes an offer for the transfer to the first player, the offer being the information related to the selection.

* * * * *